United States Patent [19]

Thoraval

[11] Patent Number: 4,547,733
[45] Date of Patent: Oct. 15, 1985

[54] AMPLITUDE AND PHASE MEASUREMENT IN ELECTROMAGNETIC LOGGING

[75] Inventor: Yvon Thoraval, Le Plessis-Robinson, France

[73] Assignee: Schlumberger Technology Corporation, New York, N.Y.

[21] Appl. No.: 332,119

[22] Filed: Dec. 18, 1981

[30] Foreign Application Priority Data

Dec. 31, 1980 [FR] France .................. 80 27869

[51] Int. Cl.$^4$ .................. G01V 3/24; G01R 25/14; H03D 13/00
[52] U.S. Cl. .................. 324/338; 324/83 D; 324/79 D; 324/341; 307/516; 328/133
[58] Field of Search .................. 324/338, 83 D, 339, 324/340, 341, 225, 233, 74 D; 328/133, 134, 114, 109, 110; 307/514–517

[56] References Cited

U.S. PATENT DOCUMENTS

| | | | |
|---|---|---|---|
| 3,849,721 | 11/1974 | Calvert | 324/338 |
| 3,944,910 | 3/1976 | Rau | 324/338 |
| 4,052,662 | 10/1977 | Rau | 324/338 |
| 4,100,483 | 7/1978 | Thompson et al. | 324/341 |
| 4,107,598 | 8/1978 | Meador et al. | 324/341 |
| 4,130,793 | 12/1978 | Bridges et al. | 324/341 |
| 4,185,238 | 1/1980 | Huchital et al. | 324/338 |
| 4,209,748 | 6/1980 | Huchital | 324/338 |

FOREIGN PATENT DOCUMENTS

| | | |
|---|---|---|
| 0511109 | 7/1980 | Australia . |
| 2404235 | 4/1979 | France . |
| 2241795 | 3/1980 | France . |
| 2379694 | 11/1980 | France . |

OTHER PUBLICATIONS

Dranetz Engr. Lab. Inc., "Applications Handbook of Precision Phase Measurement", 1975, pp. 1–2.
Hewlett-Packard Co., "Section IV: Theory of Operation", Model 3575A, Gain Phase Meter Service Manual, 6/1976, pp. 4-1-4-16.

Primary Examiner—Gerard R. Strecker
Assistant Examiner—Walter E. Snow
Attorney, Agent, or Firm—David H. Carroll

[57] ABSTRACT

An electromagnetic logging apparatus for investigating properties of an earth formation surrounding a borehole comprises an electromagnetic energy transmitter and four receivers supported by a support member, a measurement channel, and a multiplexer for selectively coupling the measurement channel to the receivers. The measurement channel comprises an amplitude processing channel including a highly gain-stabilized amplifier and gain control circuit; a phase processing channel including a highly phase-stabilized amplifier; and a circuit for measuring the amplitude and phase. The gain of the gain-stabilized amplifier is controlled by the gain control circuit in a closed loop feedback arrangement, while the gain of the phase-stabilized amplifier is controlled by the same gain control circuit without the closed loop arrangement. Phase is detected in the phase processing channel by a zero crossing detector and a mode detector, and is measured in the amplitude and phase measurement circuit by a rising edge detector, a falling edge detector, and means for determining a phase value. Amplitude is detected in the amplitude processing channel with an amplitude detector. A related electromagnetic logging method is disclosed.

14 Claims, 2 Drawing Figures

AMPLITUDE AND PHASE MEASUREMENT IN ELECTROMAGNETIC LOGGING

BACKGROUND OF THE INVENTION

The present invention relates generally to well logging systems and methods and, more particularly, to dielectric well logging systems and methods.

Well logging systems including a tool comprising a transmitter and receivers and providing a measurement of the dielectric properties of earth formations surrounding a borehole are known. In one such system, see, e.g. U.S. Pat. No. 4,185,238 issued Jan. 22, 1980 to Huchital et al. and assigned to the assignee of the present invention, electromagentic energy is generated at a first location in the borehole and the relative attenuation of the electromagnetic energy is detected at a second location in the borehole. The detection is performed using a first two receiver differential arrangement. The relative phase of the electromagnetic energy is detected at a third location in the borehole by a second two receiver differential arrangement. Means are provided for determining the dielectric constant and/or the conductivity of the formations as a function of the detected relative attenuation and relative phase.

Due to the high temperature variations present in borehole well logging, considerable drift can occur in known phase and amplitude measuring devices. Solutions have been advanced to resolve that problem. For example, as described in U.S. Pat. No. 4,100,483, issued July 11, 1978 to Thompson et al., phase measurement circuits are provided at the surface, away from the borehole temperature effects, rather than in the downhole tool. In this manner the effects of temperature variations allegedly are reduced.

Providing phase measurement circuits at the surface is disadvantageous in some ways. Data transmission complexity is increased. Moreover, the transmission medium itself, i.e. a cable, is subjected to temperature variations encountered in the borehole. Since the volume of information transmitted to the surface is greater, the task of reducing the adverse effects of these temperature variations is rendered more difficult. Thus in processing the receiver signals to extract therefrom useful information regarding phase and amplitude differences in an efficient and useful manner, the use of measurement circuitry at the surface is disadvantageous.

SUMMARY OF THE INVENTION

An object of the present invention is to receive and process electromagnetic signals having propagated through a formation surrounding a borehole and to extract amplitude and phase information therefrom in an efficient and useful manner within the borehole environment.

Another object of the present invention is to minimize the effect of temperature variation on a measurement of the relative amplitude and phase of such electromagnetic energy.

Another object of the present invention is to obtain a high degree of resolution of a measurement of the relative amplitude and phase of such electromagnetic energy.

Yet another object of the present invention is to minimize the effect of component variation in the measurement of the relative amplitude and phase of such electromagnetic energy.

Yet another object of the present invention is to compensate highly accurate amplitude and phase measurement circuitry in an electromagnetic logging device for variations in amplifier gain due to, for example, temperature effects.

Yet another object of the present invention is to control the gain of phase measurement circuitry in an electromagnetic logging device without the use of a closed-loop feedback arrangement.

Yet another object of the present invention is to provide fast gain control without degrading the performance of amplitude measurement circuitry in an electromagnetic logging device.

A further object of the present invention is to provide for the measurement of the relative phase of such electromagnetic energy independent of the measurement timing regime related to the particular way receiver measurements are derived during movement of the electromagnetic logging device.

Yet a further object of the present invention is to minimize phase variation attributable to offset in a zero crossing detector.

Yet a further object of the present invention is to provide for measurement of relative phase of such electromagnetic energy about $o$ and $\pi$ without being adversely affected by phase jitter in the received signal.

The aforementioned and other objects are achieved by the present invention in accordance with an electromagnetic logging apparatus for investigating properties of an earth formation surrounding a borehole comprising a support member, a transmitter and receiver supported by the support member, a measurement channel, and means for coupling the measurement channel to the receiver. The measurement channel comprises an amplitude processing channel including a highly gain-stabilized amplifier and gain control means; a phase processing channel including a highly phase-stabilized amplifier; means for coupling an output of the gain control means to the phase-stabilized amplifier to adjust the gain of the phase-stabilized amplifier; and means for measuring the amplitude and phase.

The phase processing channel in one embodiment of such an electromagnetic logging apparatus includes a zero crossing detector and a mode detector for determining a relative in-phase or out-of-phase relationship of the output of the phase-stabilized amplifier. The amplitude processing channel in one embodiment of such an electromagnetic logging apparatus includes an amplitude detector. The amplitude and phase measurement means in one embodiment of such an electromagnetic logging apparatus comprises a rising edge detector, a falling edge detector, and means for determining a phase value.

The aforementioned and other objects are achieved by the present invention in accordance with an electromagnetic logging apparatus for investigating properties of an earth formation surrounding a borehole comprising a support member; a transmitter and receiver supported by the support member; means for amplifying with high gain stability a received signal; means for amplifying with high phase stability the received signal; means for controlling the gain of the gain stabilized amplifying means, the output thereof further being provided to the phase stabilized amplifying means for controlling the gain thereof; means for detecting the amplitude of the received signal; means for detecting a zero crossing of the received signal; and means for measuring the amplitude and phase.

The amplitude and phase measuring means in one embodiment of such an electromagnetic logging apparatus comprises means for determining a value of the phase of the received signal that is compensated for offset in the zero crossing detecting means. The amplitude and phase measuring means in one embodiment of such an electromagnetic logging apparatus comprises means for determining a value of the phase of the received signal that is compensated for jitter of the received signal about 0 and $\pi$.

The aforementioned and other objects are achieved by the present invention in accordance with a method of electromagnetic logging for investigating properties of an earth formation surrounding a borehole, comprising the steps of generating electromagnetic energy at a first location in the borehole; receiving electromagnetic energy at a second location in the borehole; independently amplifying the received signal with low amplitude distortion and a rapidly controlled gain; detecting the amplitude of the received signal; determining an amplitude measurement; amplifying the received signal with low phase distortion and and a rapidly controlled gain; detecting a zero crossing of the received signal; and determining a phase measurement.

The phase measurement determining step in one embodiment of such an electromagnetic logging method comprises the steps of detecting a phase difference respectively between the rising edges and falling edges of the detected zero crossing and a reference signal synchronized with the transmitted electromagnetic energy, and averaging the detected phase differences. The phase measurement determining step in one embodiment comprises detecting a phase difference, accumulating the detected phase difference over a plurality of measure periods, and averaging the accumulated phase differences. An embodiment of such an electromagnetic logging method further comprises the step of offsetting said reference signal by $\pi$ when a phase difference between said received signal and said reference signal is near 0.

Other objects, features, and characteristics of the present invention will be apparent upon consideration of the following Detailed Description and the appended Claims, with reference to the accompanying Drawings, all of which are part of this Specification.

BRIEF DESCRIPTION OF THE DRAWINGS

In the Figures, where like reference characters indicate like elements.

DETAILED DESCRIPTION OF THE PREFERRED EMBODIMENT

Figure 1:
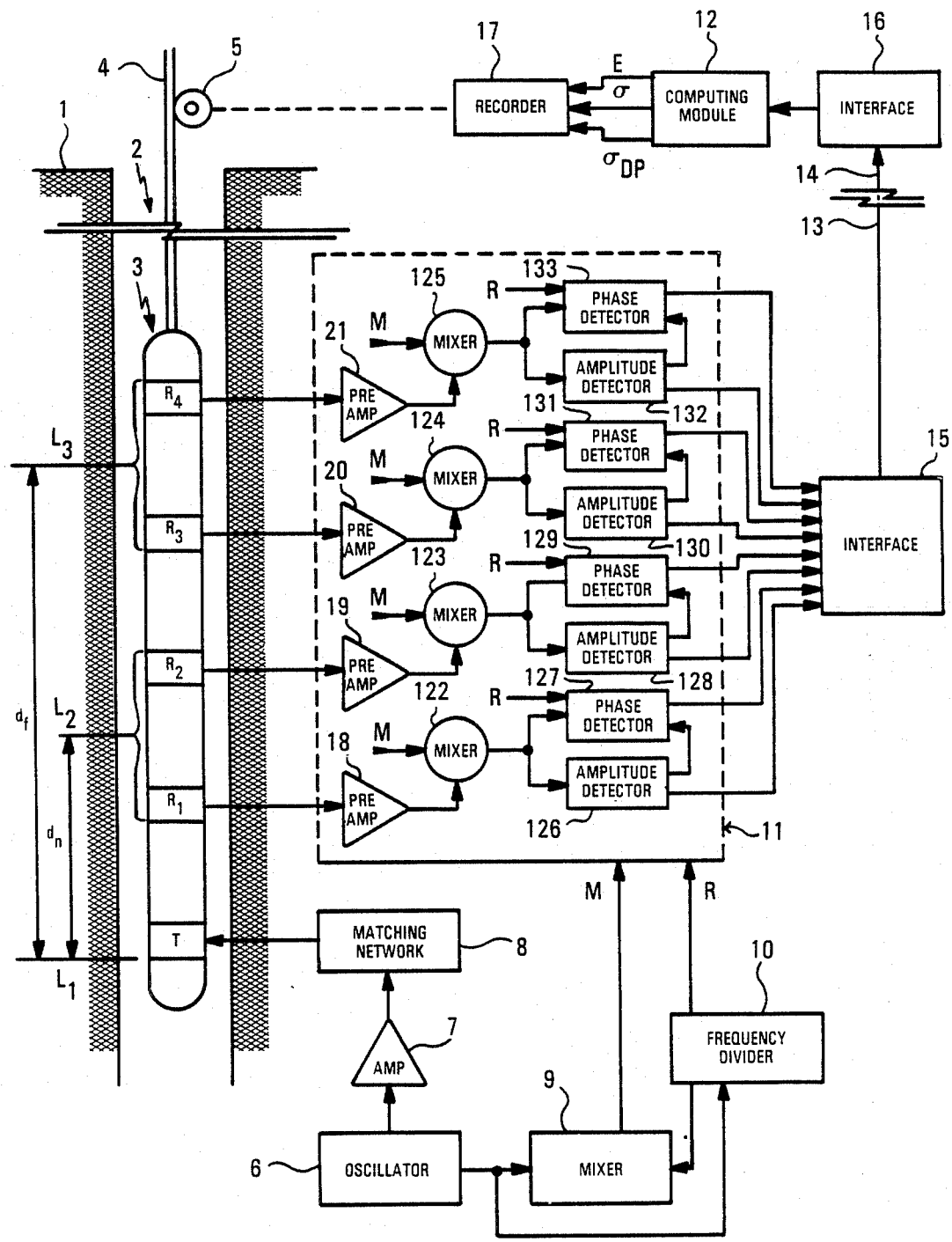
FIG. 1 is a block diagram of a well logging system, in accordance with the present invention.

FIG. 1 shows a well logging system, which is in accordance with the present invention, for investigating subsurface formations 1 traversed by a borehole 2. The borehole 2 may be filled with air or, more typically, drilling mud which may be either water-based or oil-based mud. Also, the borehole may be open or cased with a nonconductive material. The investigating apparatus or logging device 3 is suspended in the borehole 2 on an armored cable 4, the length of which substantially determines the relative depth of the device 3. The cable length is controlled by suitable means at the surface such as a drum and winch mechanism (not shown). The armored cable 4 is rewound on the drum to raise the device 3 toward the surface as formation characteristics are measured. Depth measurements are provided by a measure wheel 5 which is rotated as a result of contact with cable 4. Pulses provided by rotation of measure wheel 5 are applied to recorder 17 to provide a record of the depths at which measurements are being taken.

The logging device 3 may be a sonde which carries a transmitter T, a first or near pair of receivers $R_1$, $R_2$, and a second or far pair of receivers $R_3$, $R_4$. The transmitter T and the receivers $R_1$, $R_2$, $R_3$ and $R_4$ are preferably, but not necessarily, coils. The transmitter is designated herein as being located in the borehole at a first location, $L_1'$, the near receiver pair is designated as being located at a second location, $L_2'$ and the far receiver pair is designated as being located at a third location, $L_3'$. The second and third locations are actually regions within which the respective receiver pairs are located and, for convenience, $L_2'$ is defined as having a reference position or depth level at the midpoint between $R_1$ and $R_2$, whereas $L_3'$ is defined as having a reference position or depth level at the midpoint between $R_3$ and $R_4$. Relative spacing of the receiver pairs will be treated hereinbelow, but preferably the spacing $d_n$ between the transmitter T and the receiver pair $R_1$ and $R_2$ is of the order of one-half the spacing $d_f$ between the transmitter T and the receiver pair $R_3$, $R_4$.

For ease of illustration, the described transmitter and receiver circuitry are illustrated as being set apart from device 3, although such circuitry is generally located within the logging device 3.

The transmitter T is driven by a circuit which includes an oscillator 6, which may be of a crystal-controlled type, that generates a radio-frequency signal in the range of 10 MHz–100 MHz, and preferably about 25 MHz. The output of oscillator 6 is amplified by amplifier 7 and then coupled to the transmitter T via a balance and matching network 8. In one arrangement, a mixer 9 receives an output signal from oscillator 6 and a frequency divider 10 to provide a signal having a frequency which differs from the frequency of signals provided by oscillator 6 by a relatively low frequency, for example 10 KHz. Therefore, the output signal from mixer 9 may have a frequency of 25.01 MHz, for example. As will be described, the output of mixer 9 is mixed with the signals from the receivers to generate a further signal having a phase and amplitude related to the phase and amplitude of the receiver outputs but at a much lower frequency (10 KHz) which simplifies amplitude and phase detection operations. The frequency divider 10 receives the signal from the oscillator 6 and by suitably dividing the frequency of this signal (e.g., by 2500) produces an analog signal having a frequency (e.g., 10 KHz) suitable for obtaining a signal of suitable frequency at the output of mixer 9 (e.g., 25.01 MHz). A digital output of the frequency divider 10 is applied to a circuit 11 as hereinafter described. Alternatively, elements 9 and 10 may comprise respective oscillators synchronized with oscillator 6 to provide respective output signals having the aforementioned characteristics.

A circuit 11 functions to measure the amplitude and phase of electromagnetic wave energy detected at the receivers $R_1$–$R_4$.

The downhole circuitry is electrically coupled to surface instrumentation, including a computing module 12, through conductors 13 and 14 which are included within the armored cable 4. A communication system, between the logging tool 3 and the surface may comprise interface circuits 15 and 16 forming a part of a cable communication system. Such a system is described in French Pat. No. 2,379,694 of applicant Societe de Prospection Electrique Schlumberger and corresponding Australian Pat. No. 511,109 of patentee Schlumberger Overseas S.A., both assigned in common with the present application and incorporated herein by reference.

The computing module 12 combines the received signals and derives a measure of a relative attenuation signal from measurements provided by $R_1$ and $R_2$, for example, and a phase difference signal from measurements provided by $R_3$ and $R_4$, for example, to derive dielectric constant and conductivity values for the formation at a particular depth of investigation in the surrounding formation in accordance with, for example, the teachings of the aforementioned Huchital et al Patent. The calculated values of dielectric constant and conductivity may be applied to a recorder 17 which also receives depth indicating signals from the measure wheels 5. The recorder 17 provides a log of dielectric constant values and conductivity values for the formations surrounding the borehole as a function of depth. It will be understood that the computing module and/or recording or storage capabilities can be located at remote locations.

FIG. 1 also shows an embodiment of the circuit 11. The signals from receivers $R_4$-$R_4$ are coupled to preamplifiers 18-21. To simplify the process of amplitude detection, the outputs of preamps 18-21 are coupled to mixer circuits 122, 123, 124 and 125 respectively, which receive as their other inputs the signal from oscillator 9 which is at a frequency of 10 KHz above or below the transmitter frequency. The mixing of the two signals produces, in each case, an output signal having an amplitude and phase related to the amplitude and phase of the signal detected at a respective receiver but a frequency of 10 KHz. The outputs of mixers 122-125 are then coupled to respective measurement channels comprising, respectively, amplitude measurement and phase measurement channels 126 and 127, 128 and 129, 130 and 131, and 132 and 133. An exemplary measurement channel is described in detail hereinafter in connection with FIG. 2. It will be appreciated that a separate measurement channel need not be provided for each receiver. In fact, it is highly desirable to have a single measurement channel for all four receivers $R_1$-$R_4$ with the separate measurements being undertaken in a time-multiplexed fashion. In this manner discrepancies due to the existence of different components in different channels would not be a matter of concern. Furthermore, since a relative measurement between the outputs of different receivers require a high degreee of accuracy is desired, a multiplexed measuring scheme is particularly attractive.

Figure 2:
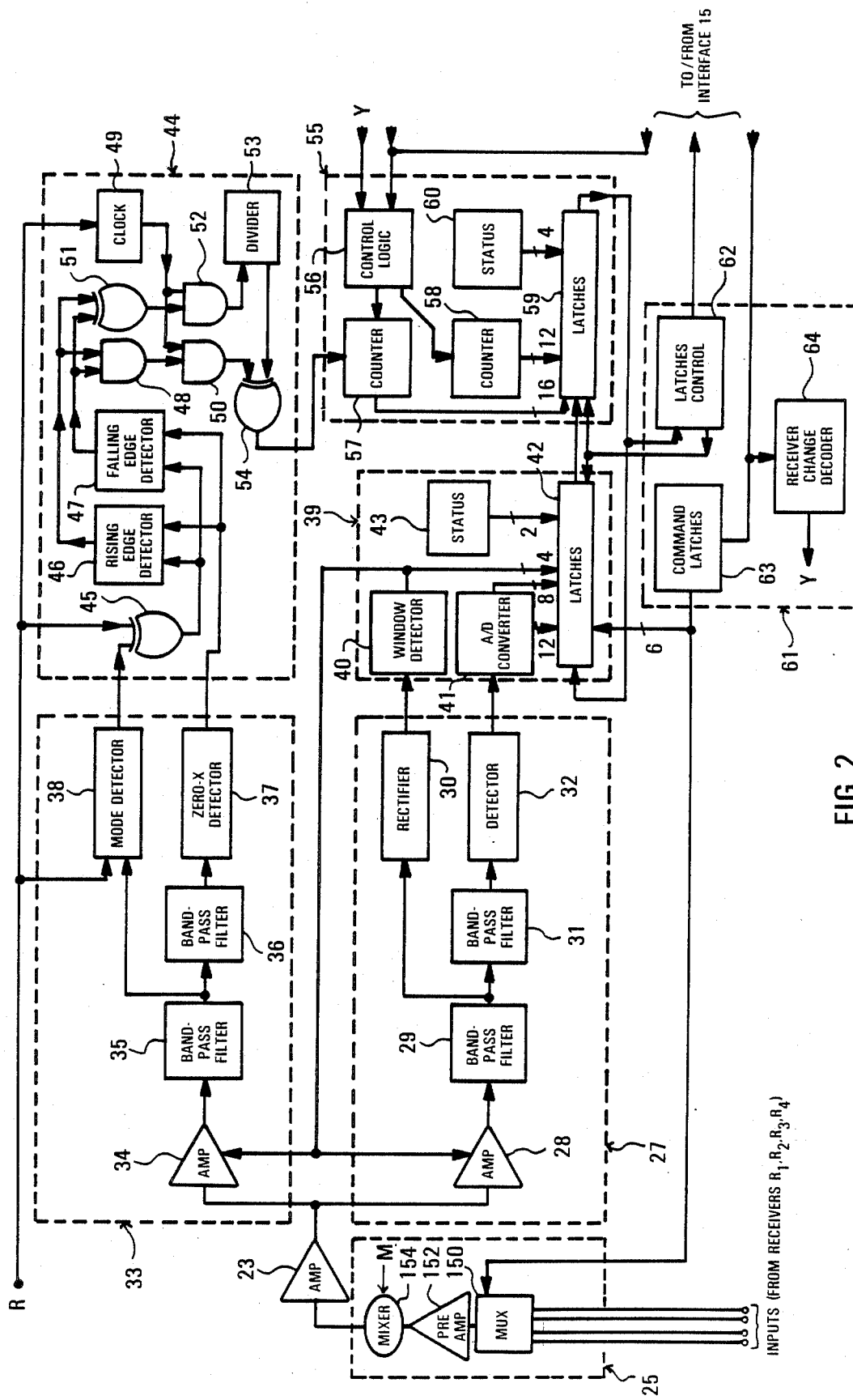
FIG. 2 is a detailed block diagram of an embodiment of an amplitude and phase measuring channel suitable for use in the system of FIG. 1 in accordance with the present invention.

FIG. 2 shows an exemplary embodiment of a measurement channel suitable for use in circuit 11, and (with the addition of a multiplexer circuit 25) particularly a time-multiplexed version of circuit 11. Circuit 25 substitutes for preamplifier-mixer pairs 18 and 122, 19 and 123, 20 and 124, and 21 and 125. Receivers $R_1$ through $R_4$ are connected to respective input channels of a 4-to-1 multiplexer 150, which is controlled in a well known way by clock pulses from command latches 63. Preamplifier 152 and mixer 154 provide for respectively mixing the output of oscillator 9 (terminal M) with the signals from each of receivers $R_1$-$R_4$ to generate for each receiver a signal having an amplitude and phase related to the amplitude and phase of the receiver output but at a lower frequency (10 KHz). This signal is applied to a measurement channel through a low noise amplifier 23, which provides a common gain for all four multiplexed signals taken from the respective receivers $R_1$-$R_4$.

The output of amplifier 23 is then coupled to an amplitude processing circuit 27, which functions as a programmable amplifier feeding two amplitude detector circuits. Its gain stability over the range of operating temperatures must be sufficient to allow the amplitude to be measured with an accuracy better than 0.1 dB. An amplifier chain 28 is constructed around operational amplifiers ("op-amps") to yield a programmable gain from 0 to 75 dB with excellent temperature stability. Gain cells from 20 dB to 10 dB may be constructed using two op-amps to obtain high gain in an open loop arrangement and high gain stability in a closed loop arrangement. A 40 dB gain cell may be constructed using two 20 dB gain cells in series which may be combinable in open or closed loop arrangements to obtain the gain and stability requirements discussed above. Analog switches (not shown) which effect the different arrangements of the op-amps are bootstrapped with respective voltage followers to avoid cross-talk therebetween.

A first amplitude detector circuit employs a bandpass 29 and a full wave rectifier 30 so as to provide an auxiliary signal which, while not very accurate, is nonetheless usable for the gain control with the advantage that the relatively fast response time needed for accurate gain control is readily achieved. A second amplitude detector circuit employs a second bandpass filter 31 supplies the output of bandpass filter 29 to an amplitude detector 32, which employs a "pulse synchronic detector" technique in an homodyne configuration using a comparator. This technique provides an output having good linearity and giving a signal suitable for accurate amplitude detection and at the same time suitable for analog to digital conversion.

The output of amplifier 23 also is supplied to a phase processing circuit 33 which processes the signal provided by the low noise preamplifier 23 to a level and form compatible with the working of a zero crossing detector. Moreover, this circuit 33 provides an output signal indicating whether the signal is in phase or out of phase with a phase reference signal provided from oscillator 10 to further improve the phase detection measurement as hereinafter described.

Due to the phase stability requirement, an amplifier 34 is constructed around high speed video amplifiers which are coupled by means of resistive-capacitive circuits. The low pass and high pass poles of the amplifiers are separated sufficiently from the intermediate frequency to maintain the phase variation versus gain below 0.1° for 30 dB. Bandpass filters 35 and 36 are chosen and arranged such as to attain the maximum Q obtainable at 10 KHz, taking into account component variation, with temperature and the gain bandwith product available with the op-amps used. The output of these bandpass filters is followed by a zero crossing detector 37. Using an "emitter coupled logic" high speed comparator in conjunction with high input signal level, the contribution in phase variation due to offset in the detector 37 can be maintained as a second order error, with the phase measurement being processed with respect to the falling and rising edges of the signal. As a practical matter, this offset causes the rising edge of the output of detector 37 to be somewhat delayed relative to the time zero crossing of the applied signal, and the falling edge to be somewhat advanced relative to time zero crossing. The effect of this offset is compensated in circuit 44, hereinafter described.

An auxiliary signal, the output of bandpass filter 35, is supplied to a mode detector 38. This auxilliary signal, though not very accurate, is quite satisfactory for purposes of mode detection and has the advantage of being supplied within the requisite response time needed for system operation. To this end, the mode detector 38 is employed in a manner such that the ambiguity (e.g., due to jitter) around zero phase is avoided by sensing when the signal is out of phase or in phase with respect to the phase reference signal supplied through terminal "R". By use of a low speed comparator, the analog input is converted into a "Complementary Metal Oxide Semiconductor" (CMOS) level which is mixed by an exclusive-OR with the phase reference. The output of this phase comparator produces a signal having a duty cycle which is a function of the phase difference. This difference of phase is thereafter filtered through a third order low pass filter giving a signal having a voltage which is proportional to the phase difference. After that, a hysteresis comparator compares the signal level to the average level between a logical "0" and "1" of CMOS logic giving a transfer function of: mode=1 around 0 and mode=0 around $\pi$. In particular as the phase difference increases from 0 to $\pi$, the mode changes from 1 to 0 at 120°, while as the phase difference decreases from $\pi$ to 0, the mode changes from 0 to 1 at 60°.

Returning now to the amplitude detection arrangements, a part of circuit 39 following the circuit 27 completes the automatic gain control loop. The amplitude which was sensed by the active full wave rectifier 30 is filtered by a low pass filter and is then applied to a window detector 40 which senses when the output is too high or too low. The window is advantageously designed so that the signal is kept away from saturation level and a level which is known to be inaccurate. Then an up/down counter (part of the window detector 40) increases or decreases the gain of amplifier 28 so as to maintain the signal level within a 5 dB range. The output of this counter which represents the gain is sent from window detector 40 to the interface 15 (as hereinafter described) with two other signals signifying "too low" and "too high" so as to warn the up-hole processing circuits that the logging measurement is out of range after automatic gain control. The counter is constructed so that it can only count from zero to fifteen and cannot underflow or overflow, and the counting frequency is chosen to be 2 KHz to avoid oscillation. In addition, in accordance with principles of the present invention, the output of detector 40 is supplied to amplifier 34 in the circuit 33 so as to increase or decrease the gain of the amplifier 34 to maintain a stable signal level appropriate for the working of the zero crossing detector. This arrangement is highly advantageous insofar as both amplifiers 28 and 34 are controlled by means of the feedback arrangement provided for the amplitude stable amplifier 28 without the need for a separate feedback arrangement to be provided for the phase stable amplifier 34.

The circuit 39 further comprises a hybrid analog-to-digital converter 41 having excellent linearity over the operational temperature range. Since a slow variation in the gain of the logging device 3 usually is encountered, the output of the converter 41 need only be corrected from its offset. An offset measurement and the measured amplitude are supplied to a parallel-to-serial converter, latches 42. It will be appreciated that timing of the gain and amplitude acquisition circuits are completely asynchronous of the timing regime of the logging device 3 and of the timing of the phase acquisition circuits as well, since it is self synchronized with the analog-to-digital converter successive approximation register. A status indicating circuit 43 supplies information to the latches 42 regarding the range of the logging measurement.

Returning now the phase acquisition circuits following circuit 33, a phase to pulse width converter circuit 44, comprising an Exclusive-OR gate 45 and a phase to pulse width converter circuit, functions to convert the phase difference between the signal provided by the zero-crossing detector 37 and a 10 KHz reference into a variable duty cycle representing the phase difference on rising and falling edges, and to give a prescaler to allow CMOS counting race. To this end, the Exclusive-OR gate 45, one input terminal of which receives the 10 KHz reference signal, serves to offset the phase measurement by $\pi$.

The phase to pulse width converter circuit is constructed around a rising edge detector 46 and a falling edge detector 47. Because of the techniques employed, the circuit is clocked on falling edges and can be viewed as two cross-coupled dividers by two. The output duty cycle of detectors 46 and 47 is equal to the phase difference between the zero crossing detector signal and the 10 KHz reference. When the phase shift between the outputs of detectors 46 and 47 is less than $\pi$, the value of the pulse width can be counted relative to a counting reference frequency. When the phase shift between the outputs of detectors 46 and 47 is greater than $\pi$, however, the two output signals provided by detectors 46 and 47 overlap. The overlapping portion of the signals are counted at twice the counting reference frequency. Accordingly, the outputs of detectors 46 and 47 are supplied to AND gate and Exclusive-OR gate 51. The phase difference determined at the counting reference frequency is obtained in the present invention by supplying the outputs of the detectors 46 and 47 to respective input terminals of the Exclusive-OR gate 51 whose output is supplied along with a signal of frequency fc from a clock 49 to respective terminals of a AND gate 52. The frequency fc is initially chosen to be as high as the circuit components permit (e.g. 81.92 MHz). The output of gate 52 is divided by two in circuit 53 and supplied, along with the output of gate 50, to Exclusive-OR gate 54. It will be appreciated, however, that the effect of divider circuit 53 is not precisely the same as dividing the frequency fc by two because the counter is reset after each measurement, giving a time resolution equal to 1/fc. The phase difference determined at twice the counting reference frequency is obtained in the present invention by supplying the outputs of the detectors 46 and 47 to an AND gate 48. The output of AND gate 48 is supplied along with the signal at frequency fc from the clock 49 to respective terminals of another AND gate 50. The output of AND gate 50 is supplied the other input of Exclusive-OR gate 54. The output of gate 54, therefore, gives a pulsed signal having a number of pulses proportional to the phase difference between the measured signal and the 10 KHz reference.

Circuit 55 controls the timing of the phase and amplitude measurement electronics and counts the pulses coming from the phase detector circuit 44. The logic of the operation of circuit 55 is as follows. A measurement cycle is initialized by a receiver change signal coming from the interface 15. A first monostable flip-flop (not shown) holds the measurement electronics in a waiting state corresponding to the relay bounces, a second monostable flip-flop (not shown) starts and enables the automatic gain control acquisition while a third monostable flip-flop (not shown) waits for a time period greater than the bandpass filter time constant. After that a cycle of amplitude and phase measurements may start and a control logic circuit 56 generates a pulse every ten intermediate frequency periods sychronizing the measurement to the real phase of the signal. As described above, the phase to pulse width converter circuit 44 provides a pulsed signal having a number of pulses which is proportional to the phase difference between the measured signal and the 10 KHz frequency, so that the phase difference is in effect equal to the number of pulses divided by the number of measure periods. The phase measurement electronics accummulates, therefore, through a first counter 57 the number of pulses and through a second counter 58 the number of measurement periods providing an integration factor to completely define the phase measurement independently of the measurement timing regime employed by the logging tool. The output of counters 57, 58 are supplied to a parellel-to-serial converter, latches 59. A status indicating circuit 60 supplies information regarding the internal state of the control electronics and of the clock 49 to latches 59.

Latches 42 and 59 are coupled to a control circuit 61 comprising a circuit 62 which controls the operations of the latches 42, 59 and supplies their respective outputs to the interface circuits. A command latches circuit 63 is coupled to the interface circuits and controls the operations of the multiplexer circuits 24 while a receiver change decoder 64 simultaneously signals the control logic circuit 56 of the switch between receivers.

While the invention has been described in accordance with the preferred embodiments as presently conceived, it is to be appreciated that the preferred embodiments are illustrative and that the invention is not intended to be limited to the preferred embodiments. Modifications of the present invention not described herein will become apparent to those of ordinary skill in the art after a perusal of this disclosure.

What is claimed is:

1. An electromagnetic logging apparatus for investigating properties of an earth formation surrounding a borehole, comprising:
   a support member movable through said borehole;
   a transmitter supported by said support member for transmitting electromagnetic energy toward said formation;
   a receiver supported on said support member a predetermined distance from said transmitter for receiving electromagnetic energy from said formation to provide a received signal;
   means for amplifying with high gain stability said received signal;
   means for amplifying with high phase stability said received signal;
   means for controlling the gain of said gain stabilized amplifying means, the output thereof further being provided to said phase stabilized amplifying means for controlling the gain thereof;
   means coupled to said gain stabilized amplifying means for detecting the amplitude of said received signal;
   means coupled to said phase stabilized amplifying means for detecting a zero crossing of said received signal;
   means for measuring said amplitude; and
   means for determining a value of the phase of said received signal relative to the phase of the electromagnetic energy transmitted by said transmitter comprising:
      a rising edge detector coupled to said zero crossing detecting means and responsive to a reference signal indicative of the electromagnetic energy transmitted by said transmitter;
      a falling edge detector coupled to said zero crossing detecting means and responsive to said reference signal; and
      a counter coupled to said rising edge detector and said falling edge detector for determining an offset-compensated phase value.

2. An apparatus as in claim 1 wherein said phase determining means further comprises:
   a mode detector responsive to said received signal and to said reference signal for determining the phase condition of said received signal and said reference signal relative to one another; and
   means coupled to said mode detector for modifying the phase of said reference signal in response to said phase condition, to compensate for jitter of said received signal about 0 and $\pi$.

3. An apparatus as in claim 1, wherein said phase value determining means comprises:
   means for counting nonoverlapping segments of the respective output signals of said rising edge detector and said falling edge detector at a first preselected counting frequency; and
   means for counting overlapping segments of the respective output signals of said rising edge detector and said falling edge detector at a second preselected counting frequency equal to twice said first counting frequency.

4. An electromagnetic logging apparatus for investigating properties of an earth formation surrounding a borehole, comprising:
   a support member movable through said borehole;
   a transmitter supported by said support member for transmitting electromagnetic energy toward said formation;
   a receiver supported on said support member a predetermined distance from said transmitter for receiving electromagnetic energy from said formation to provide a received signal;
   means for amplifying with high gain stability said received signal;
   means for amplifying with high phase stability said received signal;
   means for controlling the gain of said gain stabilized amplifying means, the output thereof further being provided to said phase stabilized amplifying means for controlling the gain thereof;
   means coupled to said gain stabilized amplifying means for detecting the amplitude of said received signal;

means coupled to said phase stabilized amplifying means for detecting a zero crossing of said received signal;

means for measuring said amplitude; and means for determining a value of the phase of said received signal relative to a reference signal indicative of the electromagnetic energy transmitted by said transmitter, comprising:

a mode detector responsive to said received signal and to said reference signal for determining the phase condition of said received signal and said reference signal relative to one another; and means coupled to said mode detector for modifying the phase of the reference signal supplied to said phase determining means in response to said phase condition, to compensate for jitter of said received signal about 0 and $\pi$.

5. An apparatus for investigating the electromagnetic properties of an earth formation traversed by a borehole, comprising:

an elongated support member adapted for movement in the borehole;

a transmitter for transmitting electromagnetic energy to said formation, said transmitter being mounted on said support member and providing a reference signal;

a receiver for receiving electromagnetic energy from said formation and providing a signal thereof, said receiver being mounted on said support member; and a measurement channel coupled to said receiver and said transmitter, said measurement channel including an amplitude measurement channel for measuring the amplitude of said received signal and a phase measurement channel for measuring the phase of said received signal relative to said reference signal, said phase measurement channel comprising a zero crossing detector for detecting the zero crossings of said received signal;

a rising edge detector coupled to said zero crossing detector and responsive to said reference signal for determining the phase difference on rising edges;

a falling edge detector coupled to said zero crossing detector and responsive to said reference signal for determining the phase difference on falling edges;

a counter coupled to said rising edge detector and to said falling edge detector for determining an offsetcompensated phase value;

a mode detector responsive to said received signal and to said reference signal for determining the phase condition of said received signal and said reference signal relative to one another; and means coupled to said mode detector for modifying the phase of the reference signal supplied to said rising edge detector and to said falling edge detector in response to said phase condition.

6. An apparatus as in claim 5, wherein said measurement channel further comprises:

means for accumulating the phase value of the electromagnetic energy received at said receiver over a plurality of measure periods; and means for determining the number of measure periods over which the phase value is accumulated.

7. An apparatus as in claim 5, wherein said counter comprises:

means for determining a phase value when a phase shift between the outputs of said rising edge detector and said falling edge detector is less than $\pi$; and means for determining a phase value when a phase shift between the outputs of said rising edge detector and said falling edge detector is greater than $\pi$.

8. An apparatus as in claim 5, wherein:

said mode detector provides at its output a transfer function of 1 around a phase condition of 0 and a transfer function of 0 around a phase condition of $\pi$, said transfer function changing from 1 to 0 at $2\pi/3$ as the phase condition increases from 0 to $\pi$, and changing from 0 to 1 at $\pi/3$ as the phase condition decreases from $\pi$ to 0; and said modifying means comprises an exclusive-or gate having an input receiving said reference signal and another input coupled to the output of said mode detector, the output of said exclusive-or gate being coupled to respective inputs of said rising edge detector and said falling edge detector.

9. An apparatus as in claim 5, wherein said counter comprises:

means for counting nonoverlapping segments of the respective output signals of said rising edge detector and said falling egde detector at a first preselected counting frequency; and means for counting overlapping segments of the respective output signals of said rising edge detector and said falling edge detector at a second preselected counting frequency equal to twice said first counting frequency.

10. An electromagnetic logging apparatus for investigating properties of an earth formation surrounding a borehole, comprising:

a support member movable through the borehole and generally elongated in the direction of movement;

a transmitter supported on said support member for transmitting electromagnetic energy toward the formation;

first, second, third and forth receivers supported on said support member separately from one another and disposed thereon generally along a line parallel to the direction of elongation of said support member, said transmitter being disposed along said line and said first, second, third and fourth receivers being located at respective predetermined distances from said transmitter, for receiving electromagnetic energy from said formation;

a multiplexer coupled to said first, second, third and fourth receivers;

a highly gain-stabilized amplifer coupled to said multiplexer;

a gain control circuit coupled to said gain-stabilized amplifier in a closed loop feedback arrangement;

an amplitude detector coupled to said gain-stabilized amplifier;

a highly phase-stabilized amplifier coupled to said multiplexer and further coupled to the output of said gain control circuit;

a mode detector coupled to said phase-stabilized amplifier and responsive to the phase of the electromagnetic energy transmitted by said transmitter for determining whether the output of said phase-stabilized amplifier is in-phase or out-of-phase with the electromagnetic energy transmitted by said transmitter;

a zero-crossing detector coupled to said phase-stabilized amplifier;

means coupled to said mode detector and responsive to the phase of the electromagnetic energy transmitted by said transmitter for offsetting the phase of the electromagnetic energy transmitted by said transmitter.
a rising edge detector coupled to said offsetting means and said zero crossing detector;
a falling edge detector coupled to said offsetting means and said zero crossing detector;
means coupled to said rising edge detector and said falling edge detector for obtaining a phase value when a phase shift between the outputs of said rising edge detector and said falling edge detector is less than $\pi$;
means coupled to said rising edge detector and said falling edge detector for obtaining a phase value when a phase shift between the outputs of said rising edge detector and said falling edge detector is greater than $\pi$;
means coupled to said less than $\pi$ phase value determining means and to said greater than $\pi$ phase value determining means for accumulating the phase value obtained thereby over a plurality of measure peroids; and
means for determining the number of measure periods over which the phase value is accumulated.

11. An apparatus as in claim 10 further comprising:
means for providing an amplitude measurement from said amplitude detector; and
means for calculating a phase measurement from said accumulated phase values and said number of measure periods.

12. A method of electromagnetic logging for investigating properties of an earth formation surrounding a borehole, comprising the steps of:
generating electromagnetic energy at a first position in the borehole;
receiving at a second position in the borehole electromagnetic energy having propagated through the formation to provide a received signal having an amplitude and phase relative to the generated electromagnetic energy influenced by the formation;
independently amplifying said received signal with low amplitude distortion and a rapidly controlled gain;
detecting the amplitude of said received signal following said step of amplifying said received signal with low amplitude distortion and a rapidly controlled gain;
determining an amplitude measurement following said amplitude detecting step;
amplifying said received signal with low phase distortion and and a rapidly controlled gain;
detecting a zero crossing of said received signal following said step of amplifying said received signal with a low phase distortion and a rapidly controllable gain;
detecting a phase difference between the rising edges of the detected zero crossing and a reference signal synchronized with the transmitted electromagnetic energy;
detecting a phase difference between the falling edges of the detected zero crossing and said reference signal; and
averaging said rising edge detected phase difference and said falling edge detected phase difference.

13. A method as in claim 12 further comprising the step of offsetting said reference signal by $\pi$ when a phase difference between said received signal and said reference signal is near 0.

14. A method of electromagnetic logging for investigating properties of an earth formation surrounding a borehole, comprising the steps of:
generating electromagnetic energy at a first position in the borehole;
receiving at a second position in the borehole electromagnetic energy having propagated through the formation to provide a received signal having an amplitude and phase relative to the generated electromagnetic energy influenced by the formation;
independently amplifying said received signal with low amplitude distortion and a rapidly controlled gain;
detecting the amplitude of said received signal following said step of amplifying said received signal with low amplitude distortion and a rapidly controlled gain;
determining an amplitude measurement following said amplitude detecting step;
amplifying said received signal with low phase distortion and and a rapidly controlled gain;
detecting a zero crossing of said received signal following said step of amplifying said received signal with a low phase distortion and a rapidly controllable gain;
detecting a phase difference between the detected zero crossing of said received signal and a reference signal synchronized with the transmitted electromagnetic energy;
offsetting said reference signal by $\pi$ when a phase difference between said received signal and said reference signal is near 0;
accumulating said detected phase difference over a plurality of measure periods; and
averaging said accumulated detected phase differences over the number of said measure periods.

* * * * *